United States Patent

Tanner

[11] 4,043,765
[45] Aug. 23, 1977

[54] ARTIFICIAL FIREPLACE LOGS WITH IGNITION STRIPS

[75] Inventor: David John Tanner, Oshawa, Canada

[73] Assignee: Linwo Industries Ltd., Ontario, Canada

[21] Appl. No.: 681,991

[22] Filed: Apr. 30, 1976

Related U.S. Application Data

[63] Continuation-in-part of Ser. No. 596,023, July 11, 1975, abandoned.

[51] Int. Cl.² .................. C10L 5/36; C10L 11/00
[52] U.S. Cl. ............................. 44/14; 44/10 R; 44/38; 44/40; 44/41
[58] Field of Search .............. 44/14, 10 R, 10 B, 38, 44/40, 41

[56] References Cited

U.S. PATENT DOCUMENTS

| 1,050,535 | 1/1913 | Hartung | 44/17 |
| 2,007,694 | 7/1935 | Rutherford | 44/41 |
| 2,666,695 | 1/1954 | Brody | 44/40 |
| 2,789,890 | 4/1957 | Stevens | 44/41 |
| 3,637,355 | 1/1972 | Brockbank | 44/41 |
| 3,726,651 | 4/1973 | Ronden | 44/14 |

*Primary Examiner*—Carl F. Dees
*Attorney, Agent, or Firm*—Steven J. Baron; Murray M. Grill; Herbert S. Sylvester

[57] ABSTRACT

An artificial fireplace log is provided which can be ignited more readily without prejudice to its subsequent combustion properties. A strip of readily flammable material is applied along the outside of the log, preferably in a groove. The readily flammable material is preferably a solid emulsion or solid solution of a low flash-point fuel.

30 Claims, 4 Drawing Figures

FIG.3

ARTIFICIAL FIREPLACE LOGS WITH IGNITION STRIPS

This application is a continuation-in-part application of my copending application Ser. No. 596,023, filed July 11, 1975 and now abandoned.

This invention relates to artificial logs made for home use in fireplaces. Such logs are well known and are commonly made of a mixture of cellulosic material, such as wood particles and petroleum fuel fractions, various chemical additives often being used to impart such properties as coloured flames and crackling and fizzling effects.

Although such logs are popular as a result of their ready availability, of their being easier to light and much more consistent in performance than real wood logs, of their generally longer burning time and of their requiring no attention during burning, their performance falls short of the ideal in several respects.

Whilst generally easier to ignite than conventional logs, known artificial logs in practice are not very readily flammable and still often require the use of ignition aids such as crumpled sheets of newspaper to assure ignition, and even then it may take some time to establish combustion over the whole length of the log. Moreover the logs tend to burn, once fully ignited, rather more rapidly and with a higher flame than is ideally desirable. Combustion tends to be more rapid during the earlier stages instead of uniform throughout the burning period of the log. Any attempt to increase the flammability of the log and thus facilitate its ignition by using petroleum fuel fractions of lower flash point or cellulosic material of lower moisture content tends to increase the combustion rate of the log undesirably or even dangerously, whilst increase of the flash point and/or moisture content, or other measures to retard combustion, tend to make the log even more difficult to ignite.

In order to obtain fairly easy ignition of the logs, it has been found desirable to incorporate wood particles of quite large size, which provide a wicking effect which facilitates ignition. Unfortunately, the presence of these large particles also tends to promote splitting of the log, thus increasing its exposed surface area and undesirably accelerating combustion.

The object of the present invention is to enable the above problem to be overcome so that an artificial log may be provided which has a desirable rate of combustion but is nevertheless easily and rapidly ignited without the need for auxiliary ignition material such as newspaper. Certain embodiments of logs in accordance with the invention can also provide a more uniform rate of combustion.

According to the invention, an artificial fireplace log comprises an elongated form retaining body of material capable of self-sustaining combustion, and a relatively narrow ignition strip comprising readily flammable combustible material bonded to and extending along the length of the body on its outside, the material of the ignition strip being selected so that once ignited its combustion is sufficiently sustained to initiate self-sustaining combustion of the combustible matter of adjacent portions of the body.

The use of an ignition strip of readily flammable material enables the body of the log to be rapidly ignited from end to end without any necessity for measures which would increase its combustion rate: indeed it becomes possible to reduce the combustion rate of the log, thus enabling the use of an increased water content in the log, which in turn may reduce or avoid the necessity for drying the cellulosic material, and may assist in obtaining "crackling" effects.

In a preferred form of log, the ignition strip is accommodated within a channel in the surface of the log. Not only does this provide protection for the ignition strip, but it is found that the presence of the channel tends to result in a more uniform rate of combustion of the log; for reasons discussed further below.

Preferably the ignition strip extends beyond the channel at at least one end onto an end of the body. This facilitates ignition of the ignition strip.

The ignition strip itself may be of a wide range of compositions, primary considerations being that it should be readily flammable, that it should have a good storage life without its efficiency being impaired by the evaporation of volatile components, that it should be bondable to the material of the body, and that its combustion should generate sufficient heat for a sufficient length of time to initiate autogenous combustion of adjacent portions of the material forming the body. One preferred material is a solid emulsion of a solid or liquid fuel in a solid phase in which the fuel is insoluble.

The invention also extends to a method of making artificial fireplace logs, comprising blending comminuted cellulosic material with petroleum fuel fractions to form a combustible mixture, extruding said mixture under pressure to provide a form retaining extrusion, extruding a strip of combustible material more readily flammable than said extrusion onto said outer surfaces of said extrusion so that it extends therealong in bonding relationship therewith, and severing said form retaining extrusion into logs. Preferably the extrusion is severed before extrusion of said strip thereunto, and preferably also the extrusion is formed with a longitudinally extending channel, the strip being extruded into said channel.

The invention is described further with reference to the accompanying drawings, in which.

Figure 1:
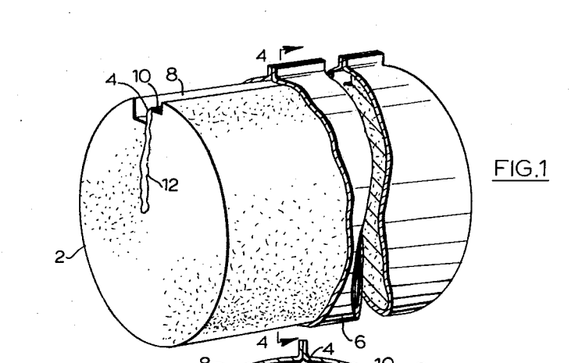
FIG. 1 is a perspective view of a log in accordance with the invention, with an outer wrapping partly broken away for the sake of clarity.
Figure 2:
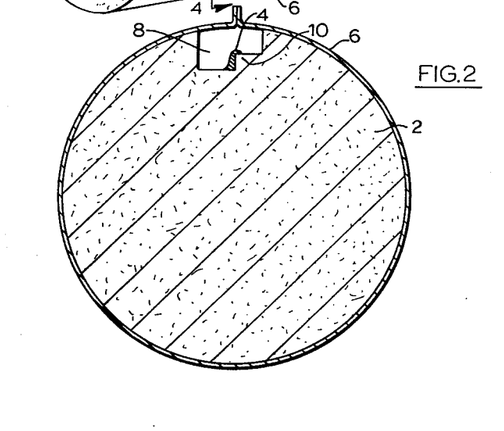
FIG. 2 is a transverse cross-section of the log of FIG. 1.

Referring to FIGS. 1 and 2, an artificial fireplace log comprises a body 2 comprising combustible material, an ignition strip 4 comprising a combustible material and more readily flammable than the material of the body and a wrapper 6. The body is formed with a longitudinal groove 8 having a step 10, the ignition strip being bonded to the body at the step 10.

The material of the body 2 comprises comminuted cellulosic material, most commonly wood, although other cellulosic materials such as crushed nut shells, straw, paper pulp and cotton waste may also be employed alone or in admixture with wood. The wood may be sawdust, or comminuted offcuts, and either hardwood or softwood may be employed. In known fireplace logs, it has been necessary to avoid the use of cellulosic materials which provide compositions in which it is excessively difficult to establish autogenic combustion, such as certain hardwoods and material having a moisture content exceeding 10–12%, even though such material may provide a higher heat output and slower combustion. Provided that the material of the body is capable of sustaining autogenic combustion in a mass that is very small compared with the body, no such restriction applies in the log under discussion and up to 20% of moisture may be present in the cellulosic material. However, it is desirable to select the cellulosic material and its moisture content in conjunction with the properties of the other components of the body so that the combustion properties of the log will be consistent and will meet desired requirements as to length of combustion time and rate of combustion.

The particle size of the cellulosic material is likewise not critical: however, it is unnecessary to use the large particles which were often necessary in prior art logs to assist ignition, and which tend to expand and split the log. Splitting increases the surface area of the log and undesirably increases its rate of combustion. To avoid splitting, the particles should desirably be less than 1 centimetre in maximum dimension.

The body material should of course be such as substantially to retain its form during combustion, since a log which melts or disintegrates in the early stages of combustion is clearly unacceptable. Compositions containing substantial proportions of particulate cellulosic materials will normally substantially retain their integrity until a late stage in combustion of the body material.

Although it is possible for the body to be formed solely of comminuted cellulosic material softened by the application of heat and high pressure and then extended, there will normally be a second principal component of the body 2 in the form of a liquid or liquefiable fuel. Usually this fuel will comprise one or more petroleum fuel fractions which will combine with the cellulosic material to form a log which is dimensionally stable at room and handling temperatures. In conventional fireplace logs, the fuel should be chosen so that its flash point, as modified by the cellulosic material, is low enough to enable ignition of the material with a match. It is rather difficult to reconcile this requirement, which tends to require the fuel to have a measure of volatility, with the conflicting requirement that the fuel, or fractions of it, should not be lost by evaporation during storage of the log, and should not be vaporised too rapidly due to heating of the interior of the log whilst it is burning. In the log of the present invention, the fuel need only have sufficient volatility to sustain, in combination with the cellulosic material, the desired autogenous combustion. It will usually be convenient to use similar petroleum fractions to those used in conventional fireplace logs.

The most commonly used petroleum fuel fraction is known as slack wax, a product which is usually obtained from crude oil after the volatile material and the useful lubricating oils are removed. In refining operations, this material is often used to the feed stock for refined wax manufacture. Depending on the refinery source, and depending on the composition of the crude oil is used in the refinery, the composition of the slack waxes will vary, but most slack waxes contain varying amounts of three main ingredients: oils, paraffin waxes, and micro-crystalline waxes. Slack waxes are usually fairly soft solids at room temperatures, liquifying at temperatures from 50° to 72° C. When mixed with the cellulosic materials, the micro-crystalline wax component, and to some extent the paraffin waxes, act as binders for the cellulosic materials, while the oils present give some degree of flammability to the artificial log although in the present invention this is of reduced significance.

In a typical case, the body will comprise 30–60% by weight of cellulosic material, and 70 to 40% by weight of petroleum fuel fractions.

Conventional additives may be included in the body material for the purpose of producing coloured flames, and crackling and fizzling effects. In natural logs, crackling and fizzling are produced by the vaporization of water trapped in the wood of the log, and in the logs of the present invention a similar effect can be achieved to a certain degree by using cellulosic material having an increased water content compared with the low water content conventionally used in artificial fireplace logs in order to avoid reducing their initial flammability. Such an increase in water content also enables the rate of combustion of the log to be controlled.

The ignition strip 4 may be of a wide range of materials but is required to have certain basic properties. Firstly, it must be readily flammable: that is, on exposure to flame, as from a match, it must be readily ignited and the flames must rapidly spread along the whole strip. Secondly, it must have sufficient calorific output for its combustion to initiate autogenous combustion of adjacent portions of the body, that is to say, it must heat the adjacent portions of the body sufficiently to establish self-sustaining combustion of these portions. Thirdly, it must be bonded to the body sufficiently securely to withstand normal handling. Fourthly, it must retain its flammability for a reasonable storage period.

Although it would be possible to use a homogeneous and totally combustible material to form the ignition strip, it has been found advantageous to use a material which on combustion provide a porous non-combustible or less readily combustible residue. This residue serves as a wicking agent, serving various useful purposes as discussed below.

In one embodiment of the invention, a stream of combustible powder or solid particles is deposited on the surface of the body material after the latter is formed and whilst it is still warm, and adheres the surface of the log which at this stage will normally be sticky. As the log cools, the powder becomes firmly affixed to the surface of the log to form the ignition strip and, with the protection afforded by the subsequent wrapping of the log, remains in the desired location and configuration until such time as the log is used.

Any powder or combination of organic powders which provides the necessary high flammability, such as is provided by a low flash point may be used. It is helpful in ensuring rapid ignition if the powder is or contains an oxidizing agent to assist rapid flame spread. The powder may be a low flash point solid such as polyoxymethylene glycol, triazone, naphthalene, or polystyrene; a flammable fatty acid or soap; or may be combination of powders such as carbon with suitable oxidizing agents and powdered rosins, waxes or sulphur. The use of powder such as those described above also yields a residue which acts as a wicking agent on the surface of the log. This wicking agent, which is less readily consumed by the flame than is the petroleum fuel present in the log, assists the initial combustion of the log surface. The effect of a wicking agent is thought to be threefold:

1. The solid is thought to act as a miniature wind tunnel, causing oxygen to be drawn into the flame front and thus assisting combustion,
2. The solid provides a large surface area for vaporization and combustion of the petroleum fuel; and
3. The solid acts as a heat sink in front of the flame to hold the fuel until it is warmed to its flash point.

In addition, the solid, when heated, often generates reactive chemical radicals which chemically assist the combustion. By these means, the heat yield required from the ignition strip to initiate self-sustaining combustion of the body material is reduced.

A particularly useful powder which can be applied to the log is the powder obtained by grinding up the polymerized solid emulsion of a fuel such as kerosene, prepared as described below, which when applied to the surface of the log and ignited provides the desired ignition and flame spread properties.

In a preferred embodiment, the ignition strip comprises a unitary form-retaining strip bonded to the extruded log. Suitable materials for use in such a unitary strip include polystyrene, styrene butadiene polymers, cellophane rods, or other similar, readily combustible, solid materials. However a strip or ribbon containing a liquid fuel in a suitable carrier is preferred. A solid solution or emulsion of the liquid fuel as described below is used, or other types of carrier may be employed.

Thus, a string or ribbon of an absorbent material, such as cotton, corrugated cardboard or hemp, may be saturated with the liquid fuel system and then deposited on the log prior to wrapping, provided that a strip of sufficient flammability can be obtained without the fuel suffering excessive evaporation during storage of the log. The solid carriers in these cases have a dual function, firstly to provide a convenient method for depositing the flammable mixture in strip or ribbon form on the log and secondly the filaments of the cotton or hemp or fibres of the board act as wicking aids to assist in rapid propagation of the flame generated by the fuel.

Examples are given below of the preparation of such ignition strips.

EXAMPLE 1

Strips of corrugated board 13 mm wide and 35 cm long with a 6.5 mm flute were impregnated with a hot solution of 170 parts by weight refined paraffin wax (M.P. 52° C) together with 85 parts by weight Fuel Oil No. 2 and 1 part of oil soluble detergent. The strips showed the following properties.

| Weight of board as % of total weight of strip | Flame spread - cm per min. | % Weight loss 2 weeks at room temp. | % Weight loss 50 days at room temp. |
|---|---|---|---|
| 52.6 | 8.5 | 3.64 | 6.66 |

EXAMPLE 2

Two ply loose woven cotton cords ¼ inch thick and 14 inches long were also impregnated with the same hot solution as in Example 1 with the following results.

| | Weight of String as % of total weight of strip | Flame Spread - cm per min. | % Weight Loss 2 weeks at room temp. | % Weight Loss 50 days at room temp. |
|---|---|---|---|---|
| Strip unflexed after cooling | 16.2 | 5.6 | 8.0 | 12.6 |
| Strips flexed after cooling | 17.9 | 5.1 | 9.1 | 11.9 |

Similar cotton cords were used to make strips using different impregnating solutions as follows:

| | | | | | | | |
|---|---|---|---|---|---|---|---|
| Refined paraffin wax (MP 52° C) pbw | 3.63 | 3.32 | 3.16 | 3.01 | 2.86 | 2.57 | 2.35 |
| Fuel Oil No. 2, parts by weight | Nil | 0.22 | 0.38 | 0.53 | 0.68 | 0.97 | 1.19 |
| String, pbw | 0.85 | 0.85 | 0.85 | 0.85 | 0.85 | 0.85 | 0.85 |
| Flame spread -cm/min | 2.06 | | | 3.38 | | 4.75 | |
| % weight loss, 6 days at room temp. | 0 | 1.48 | 2.06 | 2.73 | 3.48 | 4.44 | 8.10 |
| % weight loss, 11 days at room temp. | 0 | 1.96 | 3.22 | 3.95 | 5.62 | 6.73 | 8.60 |
| % weight loss, 140 days at room temp. | 0 | 4.90 | 7.70 | 9.60 | 13.70 | 17.80 | 22.60 |
| Refined paraffin wax (MP 58° C) pbw | 3.32 | 3.16 | 3.01 | 2.86 | 2.57 | 2.35 | |
| Fuel Oil No. 2 pbw | 0.22 | 0.38 | 0.53 | 0.68 | 0.97 | 1.19 | |
| String, pbw | 0.85 | 0.85 | 0.85 | 0.85 | 0.85 | 0.85 | |
| Flame spread -cm/min. | 2.36 | | 2.64 | | 3.94 | | |
| % weight loss, 6 days at room temp. | 0.72 | 1.24 | 1.54 | 2.33 | 3.20 | 4.03 | |
| % weight loss, 11 days at room temp. | 0.98 | 1.59 | 2.68 | 3.90 | 5.13 | 6.86 | |
| % weight loss, 140 days at room temp. | 4.63 | 7.07 | 9.47 | 12.35 | 15.90 | 20.00 | |

EXAMPLE 3

Samples of both the series of strips made according to Examples 1 & 2 were spray coated immediately after impregnation with various lacquers. Weight loss on storage is dramatically reduced. Of the lacquers tested polyvinylpyrolidone performed best as a barrier with the others in the following order of merit: cellulose acetate, vinyl cellulose, nitrocellulose, polyvinylchloride, polyvinylalcohol, polyurethane, polycarbonate, polyester, polyether, polypropylene, polyethylene and polyvinylidenedichloride.

Alternatively, the carrier may be a suitable thickener with which the fuel is mixed to form a paste. Suitable liquid fuels for use with such absorbent materials or thickeners are for example alcohols and ketones having a flash point, when incorporated in the strip, sufficiently low that ignition with one match is possible, and having a volatility sufficiently low that the fuel will be retained in the absorbent or paste. Suitable thickeners are cellulose-type derivatives such as carboxyl methyl cellulose, hydroxy methyl or propyl cellulose, alginates, and xanthene gums; inorganic thickeners such as finely divided siliceous earths, montmorillonites, or bentonite; synthetic polymers, such as polybutanols, ethylene copolymers, polyvinyl alcohols and acetates, vinyl celluloses, polyketones, polyesters, phenoxyresins, glycols and polymeric diols, vinyl butyral resins, vinyl acetate-vinyl chloride copolymers, and nitrocellulose; and natural organic products such as gelatine, gum arabic, rosins, lignosulfonates, caseinates, quebracho, mimosa, fatty soaps and alcohols, shellacs, tall oil cuts, and metal salts of fatty acids such as aluminum stearate and aluminum octinoates.

The pastes are prepared by conventional methods by adding the thickener to the liquid fuel until a paste of a suitable consistency is obtained. In order to assist in the formation of the paste, heat, water-soluble detergents and small amounts of water may be used.

The ratio of thickness to fuel varies according to the nature of the thickener used. For example, vinyl polymers will comprise 1-10% by weight of the paste; cellulose derivatives, 2-10%; natural source organic compounds, 5-15%; and inorganic clays, 5-40%.

The thickeners are added to the liquid fuel until a thixotropic paste is obtained. Such a paste can be extruded or pumped, but will retain its extruded shape. Such a paste is a non-newtonian fluid, and, as a result, the viscosity of the paste cannot reliably be used as a criteria for determining the proper consistency of the paste. The final consistency will be similar to that of other thixotropic pastes, such as toothpaste.

The addition to the paste of an absorbent solid, such as wood flour, assists in the prevention of evaporation of the liquid fuel during storage, and forms a wicking agent which assists in promoting the flame spread. Nitrates, other oxidizing agents, or chemicals, such as barium, strontium, sodium, potassium, and ammonium nitrates; organic peroxides, inorganic peroxides or perborates, hydrogen peroxide and hydrazine may be added to assist the combustion of the paste, or produce any desired pyrotechnic effects.

Where the paste composition has a relatively short storage life i.e. if exposed sheds its low flash point fuel at such a rate to have lost all the fuel within one year, the product is preferably protected from such losses by enclosing it in a sleeve of suitable material prior to application on the log. For example, pastes made from volatile alcohols, ketones or esters etc may be injected into a narrow sleeve composed of thin polyethylene. The sleeve may ideally take the form of a wide polyethylene bag 6-12 mm wide which can be filled and sealed by heated sealing jaws after being filled or plastic straws of some rigidity may be similarly used as a container for the paste. For best barrier properties when alcohol type pastes are used, it has been found that the sleeve is ideally composed of polyamine paraffinic plastics such as polyethylene, polypropylene or polyvinylacetate and polystyrene. Less efficient were wax or ethylene vinyl acetate coated papers.

Similar narrow bags may be constituted for the hydrocarbon pastes, but the barrier properties of cellulose film make it more suitable as the construction material for the sleeves. For example the paste may be injected into a bag 6-12 mm wide made of heat sealable cellulose film (coated with nitro cellulose lacquer or polyvinylidenedichloride to provide a heat sealing surface). The open end of the bag or tube is then heat sealed using heated pressure jaws. Polyvinylacetate or chloride and other synthetic plastics are also suitable for paraffinic paste sleeving. Conventional piston-nozzle filling machinery as used for toothpaste, hand-creams and shampoo sachets may be employed to fill the bags with ignition paste and efficient, high speed accumulation of the final product can result. The soft or rigid tubes of starter material can be collated and deposited on the bodies of the logs by simple automatic devices and remain in place when lodged in a reception groove of suitable dimensions, particularly if lightly rolled into the groove after application.

The ignition properties of the paste are available to full advantage if the material in the sleeve is readily combustible, as in the case of celluloses or readily melted away as is polyethylene and hot melt or wax coated substrates. Thus the sleeve is partially or totally destroyed or sufficiently deformed to expose the paste by the application of gentle heat as from a match or the burning of the log wrap.

Examples of such pastes are:

ALCOHOL OR OTHER WATER SOLUBLE FUELS

Example 4A

| | Example | Possible Range |
|---|---|---|
| Alcohol (polar organic chemical) | 60 pts. by wt | 30 – 90 |
| Water | 18 pts. by wt | 0 – 30 |
| Carboxy or Hydroxy methyl cellulose | 2 pts. by wt | 1 – 10 |
| Wood flour or charcoal | 5 pts. by wt | 0 – 20 |
| Detergent | 0.5 pts. by wt | 0 – 2 |

Example 4B

| | Example | Range |
|---|---|---|
| Alcohol | 91 pts. by wt | 60 – 98 |
| Water | 5 pts. by wt | 0 – 35 |
| Nitro or Vinyl Cellulose | 2 pts. by wt | ½ – 5 |
| Neutralizer | 2 pts. by wt | ½ – 5 |
| Wood flour or charcoal | 5 pts. by wt | 0 – 25 |

Example 4C

| | Example | Range |
|---|---|---|
| Non hydrocarbon water soluble fuel | 80 pts. by wt | 50 – 100 |
| Water | 10 pts. by wt | 50 – 0 |
| Cabosil* (Trade Mark) | 10 pts. by wt | 5 – 30 |

*fine siliceous powder

Example 5

| | Example | Range |
|---|---|---|
| Alcohol | 80 pts. by wt | 40 – 120 |
| Water | 10 pts. by wt | 0 – 40 |
| Stearic acid or stearate | 10 pts. by wt | 3 – 25 |
| Wood flour or charcoal | 5 pts. by wt | 0 – 25 |
| Detergent | 0.5 pts. by wt | 0 – 3 |

VARSOLS OR WATER INSOLUBLE FUELS

Example 6

| | Example | Range |
|---|---|---|
| Carbamide resin (C107–70 Borden Chemical) | 9 pts. by wt | 5 – 25 |
| Methanol | 1 pt. by wt | 1 – 5 |
| Water | 1½ pts. by wt | 1 – 25 |
| Ethylene glycol | 3 pts. by wt | 0 – 10 |
| Detergent | 4½ pts. by wt | 1 – 5 |
| 2% gelatine solution | 5 pts. by wt | 0 – 15 |
| Charcoal powder | 5 pts. by wt | 0 – 25 |
| Mineral spirit | 80 pts. by wt | 40 – 200 |

Example 7

| | Example | Range |
|---|---|---|
| Wood flour or charcoal | 20 pts. by wt | 0 – 48 |
| Slack wax | 80 pts. by wt | 0 – 100 |
| Mineral spirit | 10 pts. by wt | 5 – 100 |
| Detergent | 1 pt. by wt | ¼ – 5 |

Example 7-continued

| | Example | Range |
|---|---|---|
| 10% starch solution | 10 pts. by wt | 0 – 30 |
| Alcohol | 10 pts. by wt | 0 – 30 |
| Ethylene glycol | 10 pts. by wt | 0 – 15 |
| 10% Hydroxy or carboxy methyl cellulose | 30 pts. by wt | 0 – 40 |

Example 8

| | Example | Range |
|---|---|---|
| Wood flour or charcoal | 20 pts. by wt | 1 – 40 |
| Refined or slack wax | 80 pts. by wt | 0 – 100 |
| Mineral spirit | 8 pts. by wt | 10 – 100 |
| 5% Carboxy or hydroxy methyl cellulose | 5 pts. by wt | 1 – 25 |
| Detergent | 12 pts. by wt | ½ – 10 |
| Alcohol | 12 pts. by wt | 0 – 25 |
| Water | 10 pts. by wt | 0 – 25 |

Example 9

| | Example | Range |
|---|---|---|
| Clay | 20 pts. by wt | 5 – 50 |
| Water | 40 pts. by wt | 5 – 100 |
| Detergent | 4 pts. by wt | ½ – 5 |
| Wood flour or charcoal | 15 pts. by wt | 0 – 30 |
| Hydrocarbon fuel | 160 pts. by wt | 100 – 1000 |
| Wax | 20 pts. by wt | 0 – 200 |

Example 10

| | Example | Range |
|---|---|---|
| Octinoate or stearate powder | 12 pts. by wt | 5 – 30 |
| Hydrocarbon fuel | 240 pts. by wt | 100 – 500 |
| Wood flour or charcoal | 70 pts. by wt | 0 – 250 |
| Detergent | 3 pts. by wt | 0 – 10 |

As indicated above, in one preferred form of the present invention, the ignition strip comprises a solid solution, formed by dissolving a suitable liquid fuel in a suitable carrier, which has been melted to a liquid state for admixture with the liquid fuel and which solidifies upon cooling to room temperature. The liquid fuel is "trapped" inside the solid solution and is thus much less likely to evaporate during the storage period, thus prolonging the shelf life of the artificial fireplace log of which the ignition strip forms part: moreover, fuels of increased volatility may be employed, thus making it easier to obtain the required high flammability of the strip.

Suitable liquid fuels may be of an alcohol or of a hydrocarbon type. The solid solvent is selected according to the nature of the liquid fuel used.

Suitable alcohol type liquid fuels include low flash point alcohols; such as methanol, ethanol, and butanol to decanol; low flash point glycols and keto-alcohols; low flash point vinyl and glycol ethers; and low flash point ketones, esters, organic acids, and hydroxy acids. In general, liquid combustible organic chemicals having a flash point lower than about 175° C and being soluble in a solid phase are suitable.

Suitable solid solvents for the alcohol type liquid fuels are, in general, meltable solids in which a low-flash point combustible organic chemical of those types listed above is soluble. Included are such solids as piperazine, phenolnapthalamine, high molecular weight fatty acids and alcohols having a melting point above 50° C, polyethylene glycols, methoxy polyethylene glycols, phenol, resorcinol, sorbitol, mannitol, isopentyl glycol diacrylate, Esterdiol (Trade Mark) 204 (an ether glycol), polyacetone polyols, polyketones, vinyl alcohol and vinyl acetate resins, vinyl butyryl resins, and vinyl ethyl ether resins.

The proportions of liquid fuel to solid solvent will vary depending on the properties of the solvent and of the fuel. As little as 10% by weight of the liquid fuel in the solid solution is usually sufficient to give good ignition. Usually, however, as much fuel as possible is added to the particular solid solvent to be used, provided that, on cooling to room temperature, a solid solution is obtained.

A typical solid solution is one comprising 70 parts by weight of polyethylene glycol, and 30 parts by weight isopropyl alcohol.

The retention of the solvent in the solid solution may be improved by the incorporation into the solution of an absorbent material such as wood flour, or carbon powder. The use of these absorbent materials also improves the flamespread along the ignition strip, as well as providing a wicking agent as discussed above.

The use of suitable clays, such as montmorillonites, also improves the solvent retention, provides a wicking agent, and assists in controlling the viscosity of the melted solid by imparting thixotropic properties to the solution. Metal salts of fatty acids, such as aluminum stearate and aluminum octinoate may also be used for this purpose, as may cellulose derivatives such as vinyl and nitro cellulose and starches, gums & gelatines.

The value of such melt viscosity boosting chemicals is not only evident in the practical application of the material to the log, but also in the flame propagation during combustion on the log. Areas of free mobile flammable liquids are often surprisingly difficult to ignite. For example a tray of moderately low flash point liquid (about 100° F to 140° F flash point) is quite difficult to ignite with a free flame or match. It is often only when several solid bodies are floating in the liquid surface such as dead match stubs that a flame can be obtained from the liquid. The solid body is of course acting as a wick as previously described supplying the necessary surface area, wind tunnel effect, heat sink or free radicals to assist in ignition. Hence if such wicking aids are included in a solid solution ignition strip in the form of wood flour or carbon powder they can best carry out their function only if they remain at the surface even when the solid solution is melted by the advancing flame. The inclusion of melt viscosity increasing chemicals such as clays and synthetic polymers thus helps the wicking aids to remain on the melt surface and minimises the disadvantageous effect of them sinking below the surface. An alternative approach is to apply a dressing of a wicking aid or oxidising agent to the surface of the solid solution after its application to the logs.

Other useful additives to the solid solution include detergents, which are compatible with the liquid phase, to help wet the materials present, oxidizing agents, and flame colourants.

A typical solid solution is as follows, with the useful ranges in parts by weight of the components shown in brackets:

| MATERIAL | PARTS BY WEIGHT | RANGE |
|---|---|---|
| Polyethylene glycol | 70 | ( 40 – 90) |
| Isopropyl alcohol | 30 | ( 40 – 10) |
| Wood flour or carbon powder | 7 | ( 5 – 25) |
| Attagel (Trade Mark) 50 (clay) | 30 | ( 5 – 50) |
| Nonyl phenol (detergent) | 1 | (0.5 – 5.0) |

The solution is prepared by melting the solid solvent and adding the liquid fueld thereto, followed by the addition of the wood flour, or carbon powder, detergent, and clay or soluble thickener. The solution is then formed into a strip in liquid for and allowed to cool and solidify.

Suitable hydrocarbon-type liquid fuels are combustible organic chemicals having a flashpoint below about 175° C, which are soluble in solid solvents, and include napthas, varsols, mineral spirits, kerosene, paraffins, fuel oils, tall oil cuts, mineral oils, ethers, borines, benzene aromatic solvents, styrene, xylenes and silicones.

Suitable solid solvents are meltable solids in which the above liquid fuels are soluble, and which are solid at room temperature. These include paraffin waxes, microcrystalline waxes, slack waxes, ethylene vinyl acetate polymers, napthalenes, oil soluble synthetic resins such as phenolic vinyl ethyl ether resins, polyxylene, asphalt pitch, tall oil pitch, polybutylene, polyisobutylene, and polyethylene. The solid, hydrocarbon-type solutions are formed in a manner similar to that in which the alcohol-type solid solutions are formed, and may have the same additives included in them as were included in the alcohol-type solid solution.

A typical, hydrocarbon-type solid solution is as follows:

| MATERIAL | PARTS BY WEIGHT | RANGE |
|---|---|---|
| Paraffin wax (52° C m.p.) | 20 | ( 0 - 50) |
| Paraffin wax (65° C m.p.) | 20 | (50 - 0) |
| Slack wax | 10 | ( 0 - 15) |
| Kerosene | 35 | ( 8 - 45) |
| Wood flour | 4 | ( 1 - 12) |
| Attagel 50 | 25 | ( 5 - 40) |
| Detergent | 1 | (0.25 - 10) |

The retention of the liquid fuel in the solid solution is assisted by the inclusion in the solid solution of the lower melting point wax, the slack wax, the clay, and the wood flour. The detergent, which must be compatible with the liquid phase wets these ingredients to assist in the formation of the paste.

The retention of the liquid fuel at room temperature is assisted by the use of a low melting point wax, as this wax is more compatible with the liquid fuel, e.g. kerosene, than are waxes, with higher melting points, as these latter waxes tend to separate from the light paraffin liquids contained within them on cooling. However, at elevated temperatures, and in particular at the temperature at which the artificial logs are extruded, the lower melting point waxes do not retain the liquid fuels very well. Consequently, the slack wax and higher-melting point paraffin waxes can be included in the solid solution to assist in the retention of the liquid fuels at higher temperatures. The retention of the liquid fuel by the solid solutions is illustrated in Examples below.

EXAMPLES 11-14

A hydrocarbon-type solid solution was prepared, using the materials listed in Table 1, by melting the refined wax and adding the kerosene, detergent, clay and wood flour thereto. The detergent used in these and Examples 15-34 was a mixture of 70 parts by weight of a cocoa fatty acid diethanolamide with 30 parts by weight of a nonionic nonylphenyl ethylene oxide condensate. A first and second sample of the mixture were allowed to cool and solidify, and then weighed. The first sample was stored at room temperature for 15 days and the second sample was stored at 77° C for 15 days and the second sample was stored at 77° C for 15 days. The samples were then reweighed and the weight loss over the storage period determined. The results are shown below.

| Example | 1 | 2 | 3 | 4 |
|---|---|---|---|---|
| Materials | \multicolumn{4}{c}{Parts by Weight} | | | |
| Refined wax 52° C M.P. | 38.0 | 34.5 | 0.0 | 0.0 |
| Refined wax 68° C M.P. | 0.0 | 0.0 | 38.0 | 38.0 |
| Slack wax | 0.0 | 9.0 | 0.0 | 9.0 |
| Mineral spirit 180°-210° C Boiling range | 23.0 | 20.9 | 23.0 | 20.9 |
| Detergent | 1.0 | 1.0 | 1.0 | 1.0 |
| Wood flour | 4.0 | 3.6 | 4.0 | 3.6 |
| Clay | 34.0 | 31.0 | 34.0 | 31.0 |
| % wt. loss 15 days at rm.temp. | 1.9 | 5.0 | 11.1 | 9.6 |
| % wt. loss 36 days at rm.temp. | 6.9 | 11.2 | 16.5 | 16.9 |
| % wt. loss 77 days at rm.temp. | 17.0 | 17.7 | 18.3 | 17.1 |
| % wt. loss 130 days at rm.temp. | 22.4 | 19.6 | 19.4 | 18.4 |
| % wt. loss 15 days at 77° C | 22.2 | 13.6 | 12.4 | 9.1 |
| % wt. loss 36 days at 77° C | 23.1 | 19.6 | 19.3 | 15.1 |

EXAMPLES 15-18

Ignition strip material was prepared according to the method of Example 1, using the materials listed below. First and second samples were cooled, weighed and stored, exposed to the atmosphere, at room temperature and 77° C respectively. The weight losses for each sample were determined after 6 and 20 days and are shown below.

| Example | 5 | 6 | 7 | 8 |
|---|---|---|---|---|
| Material | \multicolumn{4}{c}{Parts by Weight} | | | |
| Refined wax 52° C M.P. | 37.0 | 35.7 | 0.0 | 0.0 |
| Refined wax 68° C M.P. | 0.0 | 0.0 | 39.6 | 39.4 |
| Mineral spirit 180-210° C Boiling Range | 22.1 | 21.4 | 0.0 | 31.5 |
| Fuel Oil No. 2 | 0.0 | 0.0 | 34.2 | 0.0 |
| Wood Flour | 7.4 | 10.7 | 4.3 | 4.2 |
| Detergent | 0.2 | 0.2 | 0.2 | 0.3 |
| Clay | 33.3 | 32.0 | 21.7 | 24.6 |
| % Weight Loss 6 days at Room Temperature | 0.9 | 1.2 | | |
| % Weight Loss 6 days at 77° C | 14.8 | 10.0 | | |
| % Weight Loss 20 days at Room Temperature | 1.3 | 2.3 | 8.2 | 15.7 |
| % Weight Loss 20 days at 77° C | 19.3 | 16.4 | 10.4 | 10.9 |

Examples 1 and 5 show that the low melting point paraffin wax retains the liquid fuel very well at room temperature, but displays poor retention of the liquid fuel at elevated temperatures. Example 2 illustrates that the use of slack wax improves the retention of the liquid fuel at high temperatures. Examples 3, 7 and 8 show that the higher melting point paraffin wax displays good retention of the liquid fuel at elevated temperatures, but the retention of the liquid fuel at room temperature is poorer. From these examples it can be seen that a blend of these three waxes can provide the best retention of the liquid fuels. Example 4 again illustrates the improvement in retention at both high and low temperatures afforded by the use of the slack wax. Example 6 illustrates the improvement in high temperature retention afforded by the use of the wood flour.

EXAMPLES 19-25

Further ignition strip materials were similarly prepared and tested, with the results tabulated below.

| Example | 19 | 20 | 21 | 22 | 23 | 24 | 25 |
|---|---|---|---|---|---|---|---|
| | | | Parts by Weight | | | | |
| Refined wax 68° C M.P. | 51 | 51 | 51 | 0 | 80 | 0 | 40 |
| Refined wax 52° C M.P. | 0 | 0 | 0 | 40 | 0 | 40 | 0 |
| Naphthalene | | 13 | 0 | 0 | 0 | 0 | 0 |
| Mineral Spirit 180°-210° C. boiling range | 0 | 0 | 0 | 24 | 68 | 24 | 24 |
| Fuel Oil No.2 | 44 | 44 | 44 | 0 | 0 | 0 | 0 |
| Wood flour | 5.5 | 6 | 11 | 8 | 8 | 4 | 4 |
| Clay(Attargel 150) | 0 | 0 | 0 | 36 | 0 | 0 | 0 |
| Clay(Attargel 50) | 28 | 32 | 30 | 0 | 50 | 36 | 36 |
| Water | 0 | 0 | 2.5 | 1 | 0 | 0 | 0 |
| Detergent (as in Examples 11-18) | 0 | 2 | 0.5 | 0.25 | 0.5 | 1 | 1 |
| % wt. loss 11 days at rm. temp. | 5.2 | 6.3 | 10.1 | 0.7 | 14.6 | 0.5 | 7.2 |
| % wt. loss 18 days at rm. temp. | 7.6 | | | 1.2 | | | |
| % wt. loss 25 days at rm. temp. | 9.9 | 16.3 | 16.2 | | | | |
| % wt. loss 46 days at rm. temp. | 14.7 | 19.8 | 17.6 | 2.9 | 23.2 | 10.1 | 15.8 |
| % wt. loss 54 days at rm. temp. | 16.9 | 22.1 | 19.3 | | | | |
| % wt. loss 72 days at rm. temp. | 19.0 | | | | | | |
| % wt. loss 136 days at rm. temp. | 25.9 | 31.2 | 26.6 | 20.7 | 28.1 | 22.4 | 19.4 |

In a further preferred embodiment of the present invention, there is provided a solid emulsion of a fuel within a solid phase, which fuel may be of an alcohol or hydrocarbon type.

The alcohol-type solid emulsion comprises as a fuel, a liquid or solid of low flashpoint, emulsified in a solid hydrocarbon of melting point higher than 50° C in which emulsifying agents are dissolved but in which the fuel is insoluble or only slightly soluble. Suitable low flashpoint fuels are combustible organic chemicals having a flashpoint lower than about 175° C, such as methanol, ethanol, branched or linear C4–C10 alcohols, glycols, keto-alcohols, vinyl and glycol ethers, ketones, esters, organic acids, and hydroxy acids. Suitable materials for the solid phase are solid hydrocarbons of medium melting point in which emulsifying agents are soluble, such as paraffin waxes, microcrystalline waxes, slack waxes, ethylene vinyl acetate polymers, napthalenes, oil soluble synthetic resins such as phenolic vinyl ethyl ether resins, polyxylene asphalt pitch, tall oil pitch, polybutylene, polyisobutylene, and polyethylene, and synthetic waxes. Thickeners for both separate phases of the emulsion are usefully added to impart emulsion stability and support solid additives, and may be of types previously discussed.

Suitable emulsifying agents are such detergents as nonylphenol, dodecyl phenol, and linear alcohols which are soluble in hydrocarbons.

Other compounds which may be added to the alcohol-type solid emulsions to improve the flammability of the ignition strip, or to assist in the flame spread, are wood flour, charcoal powder, and oxidizing agents.

The emulsion is prepared by melting the material selected for the solid phase, and dissolving a selected emulsifying agent therein. The desired additives are slurried with the liquid fuel, which is then added to the melted solid, with high shear mixing, to form a hot emulsion. The hot emulsion cools to a solid at room temperature.

The following compositions of the above type were prepared and tested

| Example | 35 | 36 | 37 | 38 | 39 | 40 | |
|---|---|---|---|---|---|---|---|
| Crude Petroleum wax | 60 | 40 | 40 | 60 | 60 | 60 | parts by wt. |
| Polyethylene | 1.5 | 1 | 1 | 1.5 | 1.5 | 1.5 | parts by wt. |
| Oil soluble emulsifier | 6 | 4 | 4 | 6 | 6 | 6 | parts by wt. |
| Methanol | 36 | 27 | 27 | 30 | 25 | 25 | parts by wt. |
| Water | 12 | 13 | 13 | 0 | 5 | 5 | parts by wt. |
| Wood flour | 12 | 0 | 0 | 0 | 0 | 0 | parts by wt. |
| Charcoal powder | | | 18 | 30 | | 5 | parts by wt. |
| Vinyl cellulose | | | | | 0.15 | 0.15 | parts by wt. |
| % Weight loss when exposed at room temperature for 3 months | 35 | | 34.1 | 18.3 | 23.2 | | |

The weight loss was reduced by 50% when the crude wax was replaced by micro-crystalline waxes. A further reduction was achieved when wad tougheners were included in ethylene vinyl acetate copolymers, polyisobutylene, polyesters (Acrawax (Trade Mark) from Canada Colours & Chemicals), gums, shellacs, rosins and carnuba or montan type natural waxes at a level of up to 20% by weight based on the petroleum wax. Samples of the basic wax phase emulsion when spray coated with a lacquer of shellac or polyurethane also showed dramatically less loss on exposure at room temperature.

Suitable fuels for use in the hydrocarbon type solid emulsion are combustible organic chemicals having a flash point below about 175° C, which are insoluble in the materials selected for the solid phase. These include napthas, kerosenes, varsols, paraffins, mineral spirits, fuel oils, tall oil cuts, mineral oils, ethers, borines, benzene aromatic solvents, styrene, xylenes, and silicones Suitable materials for the solid phase are such materials as piperazine, phenyl napthylamine, high molecular weight fatty acids and alcohols having melting points greater than 50° C, polyethylene glycols, methoxy polyethylene glycols, phenol, resorcinol, sorbitol, mannitol, neopentyl glycol diacrylate, Esterdiol 204, polyacetone polyols, polyketones, vinyl alcohol and vinyl acetate resins, vinyl butyrol resins, and vinyl ethyl ether resins, gelatins, gums and rosins alone or in hot aqueous solution. Suitable emulsifying agents are detergents which are compatible with the solid phase, such as dodecyl benzene sulphonate, and sulphosuccinates.

The hydrocarbon-type solid emulsions are prepared in a manner similar to that in which the alcohol-type solid emulsions are prepared. The ratio of the liquid fuel to the solid phase will be determined by the nature of the liquid fuel, the material comprising the solid phase, and the emulsifying agents. Generally, it is desired to include as much liquid fuel as possible in the emulsion, provided that upon cooling to room temperature the mixture solidifies. A typical hydrocarbon-type solid emulsion is as follows:

| MATERIALS | PARTS BY WEIGHT | RANGE |
|---|---|---|
| Polyethylene glycol | 60 | (20 – 400) |
| Kerosene | 40 | (60 – 40) |
| Detergent | 2 | (0.25 – 5.0) |

In a further mode of preparing a solid emulsion of a fuel, the fuel is emulsified in a liquid crosslinkable resin which resin is then crosslinked to solidify the resin and entrap the fuel. Thus a hydrocarbon liquid fuel may be emulsified in a liquid carbamide resin and entrapped therein by crosslinking the resin.

Suitable liquid fuels are those of the hydrocarbon-type, for example, napthas, varsols, kerosenes, paraffins, fuel oils, tall oil cuts, mineral oils, ethers, borines, benzene aromatic solvents, styrene, xylenes, and silicone resins.

These fuels are emulsified with a polymerized crosslinkable carbamide resin. This emulsion comprises up to 90% by weight of the liquid fuel, emulsified with a suitable emulsifiying agent in a continuous aqueous medium with a synthetic polymer, such as a carbamide. The emulsion is prepared by mixing the fuel, for example kerosene, with the resin, together with a suitable emulsifying agent, water, and a suitable acid catalyst. The addition of the catalyst initiates the crosslinking of the polymer to form a solid emulsion, trapping the emulsified kerosene within the emulsion, and preventing its evaporation. The speed of formation of the solid emulsion depends, to a large extent, upon the strength and concentration of the acid catalyst. Generally, the acid catalyst is selected to give a setting time which will be sufficient to allow the mixture of the fuel, the emulsifying agent, the synthetic polymer, and the water to be applied to the surface of the body material to form the ignition strip, whereupon polymerization occurs and the emulsion sets to give a brittle solid.

In addition to the conventional and well-known forms of this solid hydrocarbon polymerized emulsion, it has been discovered that the addition to the aqueous phase of various lyophobes such as lower alcohols, and glycols have the effect of allowing the use of a much stronger acid catalyst than would otherwise be possible. Normally, the use of a strong acid catalyst would result in the undesired coagulation or precipitation of the emulsion before it was properly solidified, thus resulting in a useless product. However, the use of these lyophobes allows the use of a much stronger acid catalyst, resulting in a much shorter gel time than was previously possible, thus allowing the solid emulsion to be applied to the bodies of the logs at the same rate as that at which the bodies of the logs are formed by extrusion, as described further below.

In addition, when the amount of the lyophobes is increased from about $\frac{1}{4}$ or 1 percent of the weight of the polymer, which is the weight range used to prevent coagulation, up to about 5 percent of the weight of the polymer, the emulsion is transformed from the previously known brittle form into a more elastic form which can be moulded onto a string core, or which may be moulded as a sheet and cut into strips to be applied to the body material. The solid emulsion is formed by mixing the resin, water, lyophobe, and a detergent, and adding thereto the hydrocarbon with high shear mixing to produce an oil in water emulsion. The emulsion is then fed through an in-line mixer, or a similar mixer, where the polymerization catalyst is added and then the emulsion is formed into an ignition strip before the material is fully polymerized into its solid form.

Other additives have also been discovered which give a similar plasticization effect. These are styrene-butadiene aqueous emulsions, dicyandiamide, melamine, fatty acids and fatty acid soups, gelatines, and gums, polyvinyl alcohol, diols, glycols and alcohols.

The latex emulsions are required at a level of 1 to 30 parts by weight of the carbamide resin whilst the remainder can give a toughening or elastic effect at levels in the range $\frac{1}{4}$ to 20 parts by weight of the resin.

The wrapper 6 is preferably of paper or of a plastics film which is readily burnt, decomposed or disintegrated on the application of flame. If a wrapper which is not readily combustible or destroyed by heat is employed, it must be removed before the log is ignited.

The groove 8 in the body of the log serves several purposes. Firstly, it provides a recess within which the ignition strip can be received without projecting beyond the general periphery of the log, and within which it is protected from damage. Secondly it provides an air channel unobstructed by the wrapper 6 along which air can pass to assist rapid flame spread along the ignition strip once lighted. Thirdly, it provides a preferred and somewhat localized primary site of combustion once the log is fully ignited which is found to reduce the initial rate of volatilization of the fuel content of the body, thus tending to even out the rate of burning of the log during the period for which combustion continues. The step 10 in the groove provides a projecting portion of the body material which is more readily ignited by the ignition strip whilst the groove tends to reduce dissipation of the heat output of the strip. The step also provides a better bonding site for the strip than would a smooth surface. The continuation of the strip down the ends of the log as shown at 12 in FIG. 1 provides for easy initial ignition of the strip.

The ignition strip may be applied to the body in a number of ways. The mode of application of ignition strips of powdered material has already been mentioned, and it is also possible to secure preformed ignition strips to preformed-log body, for example by use of a preferably combustible adhesive or cement. Where the body material is extruded, it is possible to extrude the ignition strip material at the same time and sever the combined extrusion into suitable lengths for use as logs.

Figure 3:
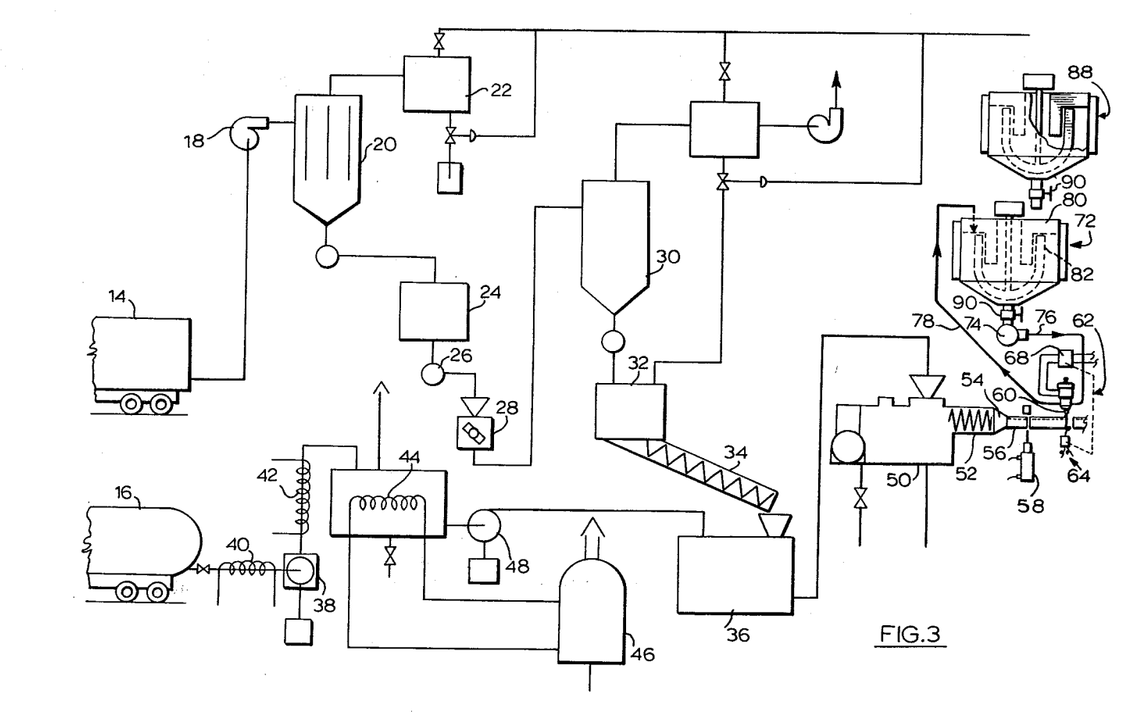
FIG. 3 is a schematic diagram of apparatus for producing logs in accordance with the invention, and FIG. 4, which appears on the same sheet as FIGS. 1 and 2, is a detail showing part of the apparatus of FIG. 3.
Figure 4:
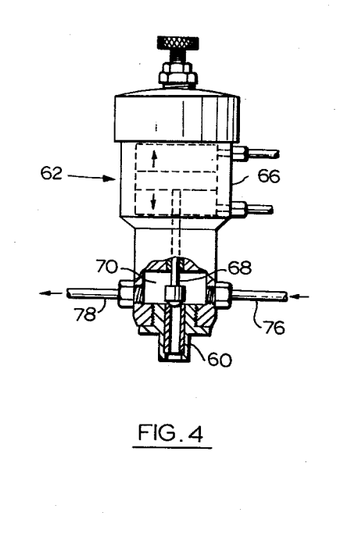

However, a preferred method of forming the logs of the invention is described with reference to FIGS. 3 and 4. The primary raw materials for forming the logs, sawdust and slack wax are delivered in vehicles 14 and 16 respectively. The sawdust is discharged from the vehicle 14 and forced into the tangential inlet of a cyclone separator 20 by a fan 18.

The cyclone overflow, comprising the dust particles from the sawdust, is passed to a bag house 22 for filtration, whilst the underflow comprising the larger particles is passed to a holding tank 24 whence it is drawn as required by a screw feed 26 and fed to a hammer mill 28 which breaks down the large particles. Dust particles are then again removed in a second cyclone separator 30, the remaining particles from the underflow of the separator being passed to a second holding tank 32 in which the moisture content of the particles may be adjusted if desired. Thence the particles, which are now of a controlled size range and moisture content, are fed as required by a screw feed 34 to a mixer 36.

Wax from the vehicle 16 is discharged by means of a heated pump 38 and heated pipes 40, 42 into a holding tank heated by a coil 44 through which hot water is passed from a boiler 46. Wax from the holding tank is delivered to the mixer 36 by a metering pump 48.

In the mixer 36, the wax is thoroughly blended with the sawdust particles and any desired additives as for coloured flames or 'crackle' effect are added. The mixture was then passed to an extruder 50 which forces the mixture through a water cooled nozzle 52 and a die 54 to form a continuous solid extrusion 56 which is sheared into log lengths by a fluid operated shear 58. The die 54 is shaped so as to form the recess 8 and shelf 10 previously described in the top of the extrusion. Other grooves may also be introduced at the die to assist flame travel over the whole face of the log. A conveyor, not shown, advances the logs so formed beneath the nozzle 60 of a dispensing valve 62 shown in more detail in FIG. 4, from which nozzle a narrow stream of liquid material which solidifies to form the ignition strip is discharged on to the edge of the shelf 10 of each log as it passes under the nozzle. The valve is electrically controlled by a limit switch 64 having an actuating lever which is depressed by a passing log from just before it passes beneath the nozzle until just after it passes out from under the nozzle, this resulting in the desired extension 12 of the ignition strip on the ends of the log as the liquid runs down these ends.

The limit switch 64 controls by means of a solenoid valve 68, the air supply to a double acting fluid operated actuator 66 which operates a plunger 68 which moves to open or close the entrance to the nozzle 60 from a chamber 70 which is maintained full of pressurized liquid continuously circulated from and back to a mixing tank 72 by means of a pump 74 and pipes 76 and 78. The mixing tank comprising a stator 80 interacting with a rotor 82 driven by a motor 84, and a heater 86, and is used to produce the liquid ignition strip forming material, which may be any of the materials discussed above which are capable of being formed as a liquid which solidifies on cooling, preferably a solid emulsion selected to provide desired storage and shelf life properties. In order that one batch of emulsion may be prepared whilst another is dispensed, a second mixing tank 88 may be provided, the tanks being alternately connected to the pump 74 by means of valves 90.

Examples of the laboratory preparation of properties of certain suitable ignition strip materials have already been given above. An example of preparation on a factory scale, together with examples of the manufacture of the fire logs in accordance with the invention, are given below.

EXAMPLE 41

Factory batches of material for ignition strips were made by charging the ingredients to the mixing tank 72 or 88, the melt being held before use for a minimum of 30 minutes at 58° C after all materials were charged. The proportions of the ingredients and the properties of successive batches were as follows:

| Batch No. | Parts by weight | | | | | | | |
|---|---|---|---|---|---|---|---|---|
| | 1 | 2 | 3 | 4 | 5 | 6 | 7 | 8 |
| Refined wax (M.P. 52° C) | 170 | 170 | 170 | 170 | 170 | 170 | 170 | 170 |
| Fuel oil No. 2 | 90 | 90 | 90 | 90 | 90 | 76 | 76 | 76 |
| Detergent | 2 | 2 | 2 | 2 | 2 | 2 | 2 | 2 |
| 100 mesh softwood flour | 24 | 24 | 24 | 24 | 24 | 24 | 24 | 24 |
| Attagel 50 | 75 | 75 | 75 | 75 | 75 | 75 | 75 | 75 |
| % wt. loss after: | | | | | | | | |
| 17 days at RT | 0.2 | 0 | 0 | 0 | 0 | 0 | 0 | 0 |
| 75 days at RT | 1.4 | 0.4 | 1.5 | 1.0 | 4.6 | 0.9 | 0.4 | 1.2 |
| 130 days at RT | 2.7 | 1.3 | 3.1 | 2.9 | 6.0 | 1.7 | 0.8 | 1.8 |
| 272 days at RT | 2.7 | 2.0 | 3.2 | 2.9 | 6.9 | 2.6 | 1.2 | 2.9 |

The unusually high weight losses experienced with batch No. 5 suggested that the fuel oil content of the mixture might be too high for consistent stability, and the fuel oil content was therefore slightly reduced in subsequent batches. The material was applied to fire logs made from wood chips and slack wax using the apparatus described with reference to the drawings, and the firelogs wrapped in wax paper. The amount of ignition strip material applied to the logs was varied, being 28–35 grams per log in earlier batches, subsequently reduced to 14 grams per log. Tests have indicated that as little as 10 grams per log would be sufficient.

Log ignition tests were carried out similar to those described in Example 42 below, using 14 grams of ignition strip material from batch 6. The control logs were made with the groove but with no strip material.

| Ignition results | No strip | With Strip |
|---|---|---|
| Number of logs which had flames end to end: | | |
| (a) in under 10 mins. | 13 | 167 |
| (b) after 10 mins. before 15 mins. | 18 | 31 |
| (c) after 15 mins. | 18 | 14 |
| (d) failed to light | 3 | 3 |
| (e) average time for flames end to end (mins.) | 15.1 | 7.4 |
| Total number of tests | 52 | 215 |

EXAMPLE 42

A mixture was prepared of 60% by weight slack wax, 37% by weight sawdust, and 3% by weight additives to give coloured flame, and was extruded and quillotined to provide 100 logs 35 centimeters long by 10 centimeters in diameter, which were wrapped in paper and allowed to cool.

An additional 100 logs of the same diameter and composition were extruded with a groove about 6 mm deep and about 10 mm wide on their surface, and then cut to 35 centimeter lengths. Into the groove of each log was poured 28 grams of a hot solid solution of the following formula:

| Slack wax | 17.5% by weight |
|---|---|
| Paraffin wax 52° C M.P. | 11.2% by weight |
| Paraffin wax | |

-continued

| | |
|---|---|
| 68° C M.P. | 11.2% by weight |
| Stove Oil No. 2 | 23% by weight |
| Hardwood wood flour: mesh 20-80 | 6.8% by weight |
| Montmorillonite clays: | |
| Attagel (Trade Mark) 150 | 15.0% by weight |
| Attagel (Trade Mark) 50 | 15.0% by weight |
| Detergent | 0.4% by weight |

A small amount of the hot solution was allowed to drip over the ends of the logs before the solution cooled and solidified. The logs were then wrapped and allowed to cool.

Each of the two hundred logs was individually tested as follows. Each log was ignited by applying a match to each end of the wrapper until the wrapper ignited, and the resulting ignition of the firelog was observed. The results are given below, and relate to the ignition of the artificial fireplace log itself and not to that of the wrapper. The results clearly demonstrate the advantages to be obtained by using the ignition strip.

| Ignition Results | Conventional Logs | Logs with Ignition Strip |
|---|---|---|
| A. Number of Logs that | | |
| (a) did not ignite at either end | 5 | 0 |
| (b) ignited at one end only | 15 | 0 |
| (c) ignited at both ends | 80 | 100 |
| B. Number of Logs which had Flames spread end-to-end | | |
| (a) in under 5 minutes | 3 | 85 |
| (b) after 5 minutes and before 10 minutes | 20 | 15 |
| (c) after 10 minutes and before 20 minutes | 40 | 0 |
| (d) after 20 minutes and before 30 minutes | 20 | 0 |
| (e) after more than 30 minutes from time of lighting wrapper | 17 | 0 |

I claim:

1. An artificial fireplace log, comprising an elongated form retaining body having an outer surface and formed of a material capable of self-sustaining combustion, at least one groove on the outer surface of said body in longitudinal alignment therewith, at least one ignition strip integral with and disposed in at least one of said grooves.

2. An artificial fireplace log according to claim 1 wherein said body comprises a combination of particulate cellulosic material and one or more petroleum fuel fractions.

3. An artificial fireplace log, according to claim 1 wherein said body includes a cellulosic material having up to about 20% by weight moisture therein and which substantially retains its form during burning.

4. An artificial fireplace log according to claim 2 wherein the particles are less than 1 centimeter in maximum dimension.

5. An artificial fireplace log according to claim 2 wherein said body comprises approximately by weight 30-60% cellulosic material and 70-40% petroleum fraction.

6. An artificial fireplace log according to claim 1, wherein the ignition strip contains a wicking agent.

7. An artificial fireplace log according to claim 1, wherein said body includes a combustible powder adhered to said outer surface.

8. An artificial fireplace log according to claim 1, wherein the ignition strip is a ribbon of an absorbent material saturated with one or more combustible fuels.

9. An artificial fireplace log according to claim 8 wherein the saturated ribbon is subsequently coated with a varnish to minimize fuel loss.

10. An artificial fireplace log according to claim 1, in which the body is an elongated cylinder having an arcuate outer surface and a substantially constant radius.

11. An artificial fireplace log according to claim 10 wherein the groove is formed with and internal shelf, and the ignition strip contacts said shelf.

12. An artificial fireplace log according to claim 1 wherin the ignition strip is a form retaining paste comprising a liquid fuel in admixture with a thickener.

13. An artificial fireplace log according to claim 12 wherein the liquid fuel has a flash point below about 175° C and having a volatility sufficiently low that the fuel is retained in the paste.

14. An artificial fireplace log according to claim 13 wherein the paste is thixotropic.

15. An artificial fireplace log in accordance with claim 12 wherein the paste is enclosed in a heat destructible sleeve before application to the log.

16. An artificial fireplace log according to claim 1 wherein the ignition strip comprises a solid solution of a liquid fuel dissolved in a carrier that is normally solid at room temperature.

17. An artificial fireplace log according to claim 16 wherein the liquid fuel is a combustible organic chemical having a flash point below about 175° C.

18. An artificial fireplace log according to claim 16 wherein the carrier is a meltable solid in which the fuel is soluble.

19. An artificial fireplace log according to claim 18 wherein the ignition strip further comprises at least one material selected from the group consisting of wood flour, carbon powder, montmorillonites, and metal salts of fatty acids.

20. An artificial fireplace log according to claim 16, wherein the ignition strip has a surface dressing of a wicking or oxidizing agent.

21. An artificial fireplace log according to claim 1 wherein the ignition strip comprises a solid emulsion of a solid or a liquid fuel having a flash point lower than about 175° C within a solid phase in which said fuel is substantially insoluble.

22. An artificial fireplace log according to claim 21 wherein the fuel is selected from the group consisting of methanol, ethanol, branched or linear $C_4$-$C_{10}$ alcohols, glycols, keto-alcohol vinyl and glycol ethers, ketones, esters, organic acids, and hydroxy acids, and the solid phase is a hydrocarbon of melting point above 50° C in which an emulsifying agent is dissolved but the fuel is substantially insoluble.

23. An artificial fireplace log according to claim 22 wherein the solid hydrocarbon is selected from the group consisting of paraffin waxes, microcrystalline waxes, slack waxes, ethylene vinyl acetate polymers, napthalene, oil soluble synthetic resins such as phenolic vinyl ethyl ether resins, polyxylene, asphalt pitch, tall oil pitch, polybutylene, polyisobutylene, and polyethylene.

24. An artificial fireplace log according to claim 22 wherein the emulsifying agent is a detergent selected from the group consisting of nonyl phenol and dodecyl phenol, and linear alcohols which are soluble in hydrocarbons.

25. An artificial fireplace log according to claim 21 wherein the fuel is selected from the group consisting of naphthas, kerosenes, fuel oils, tall oil cuts, mineral oils, ethers, borines, benzene aromatic solvents, styrene, xylenes, and silicone resins.

26. An artificial fireplace log according to claim 25 wherein the solid is selected from the group consisting of piperazine, phenyl naphthylamine, high molecular weight fatty acids and alcohols having melting points greater than about 50° C. polyethylene glycols, phenol, resorcinol, sorbitol, mannitol, neopentyl glycol discrylate, polyacetone polyols, polyketones, vinyl alcohol and vinyl acetate resins, vinyl butyrol resins, and vinyl ethyl ether resins.

27. An artificial fireplace log according to claim 26 in which the solid includes a compatible emulsifying agent.

28. An artificial fireplace log according to claim 27, in which the emulsifying agent is a detergent selected from the group consisting of dodecyl benzene sulphonate, and sulphosuccinates.

29. An artificial fireplace log according to claim 21, wherein said solid phase is a polymerized carbamide resin cross-linked after formation of the emulsion, and the liquid fuel is selected from the group consisting of naphthas, kerosenes, fuel oils, tall oil cuts, mineral oils, ethers, borines, benzene aromatic solvents, styrenes, xylenes, and silicone resins.

30. An artificial fireplace log, comprising an elongated form retaining body having an outer surface and formed of a material capable of self-sustaining combustion, said outer surface having deposited thereon a stream of combustible powder or solid particles.

* * * * *